United States Patent [19]
Stephens et al.

[11] Patent Number: 5,557,485
[45] Date of Patent: Sep. 17, 1996

[54] ALIGNMENT AND LATCHING MECHANISM IN A DRIVE FOR MAGNETIC DATA TAPE MINI-CARTRIDGES

[75] Inventors: Fred O. Stephens; Devin A. Bloom; Michael P. Eland; Gregory A. Standiford, all of Loveland; Jon R. Dory, Ft. Collins, all of Colo.

[73] Assignee: Hewlett-Packard Company, Palo Alto, Calif.

[21] Appl. No.: 414,972

[22] Filed: Mar. 31, 1995

[51] Int. Cl.$^6$ ................................................. G11B 5/008
[52] U.S. Cl. ........................................................ 360/96.5
[58] Field of Search ...................................... 360/96.5

[56] References Cited

U.S. PATENT DOCUMENTS

| | | | |
|---|---|---|---|
| 3,964,098 | 6/1976 | Kramer et al. | 360/93 |
| 4,156,260 | 5/1979 | Joshi | 360/96.1 |
| 4,622,606 | 11/1986 | Rudi | 360/96.5 |
| 4,656,541 | 4/1987 | Rhyner et al. | 360/96.5 |
| 4,866,552 | 9/1989 | Nagase | 360/96.5 |
| 5,315,462 | 5/1994 | Ohkubo et al. | 360/96.5 |
| 5,323,280 | 6/1994 | Rudi | 360/96.5 |
| 5,331,485 | 7/1994 | Bryer | 360/96.5 |

*Primary Examiner*—A. J. Heinz
*Attorney, Agent, or Firm*—Augustus W. Winfield

[57] ABSTRACT

An alignment and latching apparatus for a drive mechanism for data tape mini-cartridges. The alignment and latching apparatus enables the drive to use a new mini-cartridge while retaining backward compatibility with older smaller mini-cartridges. The mini-cartridges have a plastic top cover and a rigid metal baseplate. For some embodiments, an alignment datum is defined by three reference points on the bottom of the mini-cartridge baseplate. In other embodiments, the alignment datum is split with two reference points on the top of the baseplate and one reference point on bottom of the baseplate. Alignment and latching forces are applied on both the plastic cover and onto the baseplate. In some embodiments, alignment force on the top cover is provided by flat springs. In alternative embodiments, alignment force on the top cover is provided by spring loaded rollers. Alignment force on the baseplate is provided by rollers or cam surfaces, pushing upward if a split datum is required and downward if a bottom surface datum is required.

15 Claims, 19 Drawing Sheets

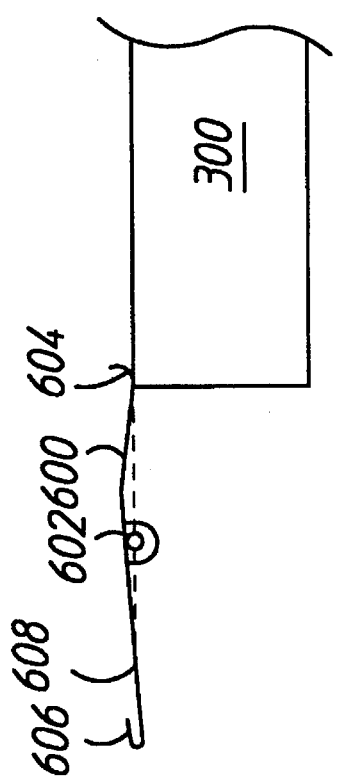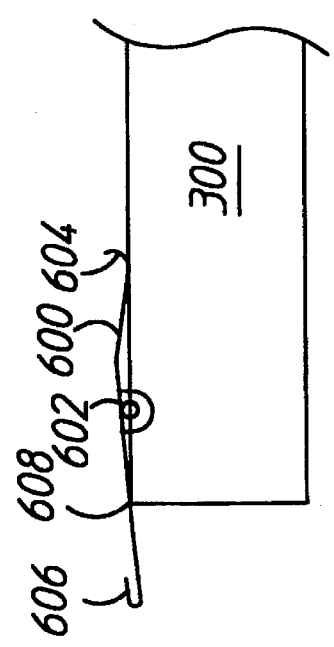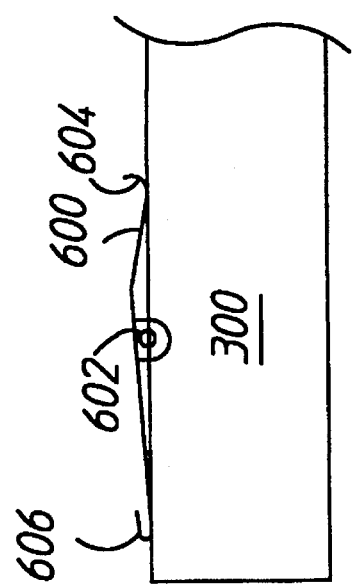

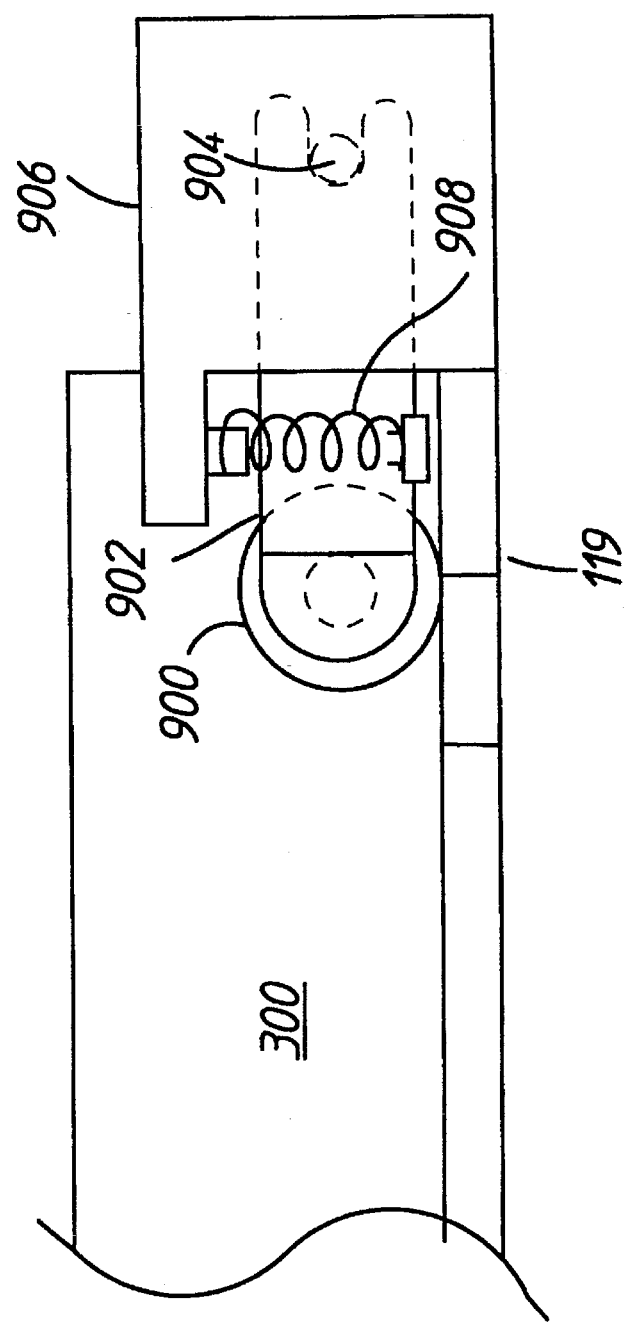

ALIGNMENT AND LATCHING MECHANISM IN A DRIVE FOR MAGNETIC DATA TAPE MINI-CARTRIDGES

CROSS-REFERENCE TO RELATED APPLICATION

This application is related to application Ser. No. 08/414,998 filed concurrently on Mar. 31, 1995.

FIELD OF INVENTION

This invention relates generally to computer mass memory drive mechanisms and more specifically to a mechanism for providing mechanical alignment forces onto a magnetic data cartridge inserted into the drive.

BACKGROUND OF THE INVENTION

In general, drive mechanisms for audio tape cassettes, video tape cassettes, data tape cartridges, removable disk cartridges and other removable media must have some way to mechanically position a removable medium relative to internal drive parts that have fixed positions. For example, for typical magnetic tape cartridges and drives, a magnetic head in the drive has a fixed position in a direction perpendicular to the plane of the tape and the magnetic tape in the removable cartridge must be precisely aligned relative to the magnetic head. In addition, in general, the tape cartridge must be securely latched into the alignment position to prevent movement of the cartridge relative to the head during vibration or mechanical shock of the drive.

Of particular interest to the present application are belt-driven, rigid baseplate, magnetic tape mini-cartridges commonly used in the personal computer industry for data storage. In general, these mini-cartridges have evolved from a data cartridge design that was first introduced for use in the computer industry by the Minnesota Mining and Manufacturing Company (3M) in the early 1970's (U.S. Pat. No. 3,692,255, issued to Robert A. Von Behren in 1972). The belt driven magnetic data cartridges introduced by 3M in the early 1970's were approximately 100 mm by 150 mm and the magnetic tape was 6.35 mm (0.250 inches) wide. Cartridges of that size and corresponding drive mechanisms are still commercially available. In 1976, smaller mini-cartridges were developed, as described by Alan J. Richards, *Mini Data Cartridge: A Convincing Alternative for Low-Cost, Removable Storage*, Hewlett-Packard Journal, May, 1976. The mini-cartridge size is 63.5 mm by 82.5 min. Versions of the mini-cartridge are commercially available from a variety of vendors with tape widths varying from 3.81 mm (0.150 inches) to 8.00 mm (0.315 inches).

Recently, 3M has introduced improved mini-cartridges with increased data capacity. The new mini-cartridges are larger than the mini-cartridges described above. There is a need for drives that can accommodate (mechanically align and latch) both the old and new tape mini-cartridges.

FIG. 1A (prior art) illustrates a mini-cartridge 100 and compatible drive 102. The mini-cartridge 100 has a metal baseplate 104 and a plastic cover 106. The plastic cover 106 on the mini-cartridge 100 has a top surface 108 (the largest surface), a front surface 110 having two openings 112, 114) (one (112) for accepting a drive roller in the drive mechanism and a second (114) for accepting the magnetic head in the drive mechanism), and two side surfaces (116, 118). Each side surface has an elongated channel (for example, channel 120 for side 118) parallel to the metal baseplate 104 with one side of each channel formed by an exposed portion of the top of the metal baseplate.

The metal baseplate has a top surface 122 (facing the plastic cover) and a bottom surface 124. The top surface 122 of the metal baseplate 104 is partially exposed and the bottom surface 124 is fully exposed. Figure 1B (prior art) is a top view of the metal baseplate 104 with the plastic top and other parts removed. The dashed lines 126 and 128 indicate the position of the side walls of the plastic top illustrating the area of the baseplate that is exposed. A notch 119 (one of two) is explained below. Three reference points (130, 132, and 134) on the exposed portion of the top surface of the metal baseplate define a reference plane (datum) for the mini-cartridge. The mini-cartridge reference plane must be precisely aligned relative to a corresponding reference plane within the drive 102.

A typical drive for a mini-cartridge has elongated guides (FIG. 1A, 136, 138) corresponding to the channels (FIG. 1A, 116, 118) in the mini-cartridge sides for alignment of the mini-cartridge to the drive in a direction parallel to the metal baseplate of the mini-cartridge (FIG. 1A, arrows 140). Alignment of the mini-cartridge to the drive in the direction perpendicular to the metal baseplate of the mini-cartridge (FIG. 1A, arrows 142) is accomplished by forcing the three exposed reference points (FIG. 1B, 130, 132, 134) on the top surface of the metal baseplate up against three corresponding reference points on the lower surfaces of the chassis guides (FIG. 1A, 136, 138). Typically, the forces applied for alignment are also sufficient to latch the mini-cartridge into the drive, preventing cartridge-drive relative movement during vibration and mechanical shock.

FIG. 1C (prior art) illustrates a side view of the baseplate 104 in alignment with chassis guide 138. Note that reference points 132 and 134 on the baseplate 104 are in contact with corresponding reference points or surfaces 152 and 154 on the guide 138 in the drive chassis. Alignment force (arrow 150) is provided by a spring loaded roller 148 in the drive chassis that presses up onto the forward edge of notch 119 in the baseplate. Forward force results from the round roller pressing on the forward edge of the notch. An identical roller engages an identical notch on the opposite face (116) of the mini-cartridge. The vertical force provides alignment of the top surface reference points (130, 132, and 134). The forward force provides alignment of the front surface of the baseplate 104 against corresponding chassis stops 156.

The new mini-cartridges have a plastic cover front surface that is dimensionally identical to the front surface 110 of the older mini-cartridges. All other surfaces, however, are changed to accommodate larger tape reels. As a result of the larger tape reels, the channels in the mini-cartridge sides cannot extend along the entire length of the sides. As a result of shorter side channels, only a limited portion of the top surface of the metal baseplate is exposed. In particular, one of the three reference points (FIG. 1B, reference point 134) defined for the older mini-cartridges is not exposed. The new mini-cartridges could be clamped within the reduced area of exposed baseplate top surface. However, the new mini-cartridges have a substantial mass outside the exposed area of the baseplate that must be cantilevered if the clamping is only within the exposed area. Therefore, the smaller exposed area may not be sufficient to ensure adequate latching for vibration and mechanical shock. In addition, any increased clamping forces may also undesirably increase the force required to insert the mini-cartridge into the drive. New methods and mechanisms are needed to align and latch the new mini-cartridges and the new alignment and latching mechanisms must also be compatible with the older mini-cartridges.

SUMMARY OF THE INVENTION

Various embodiments of mechanisms are provided that align and latch both old and new mini-cartridges. In one set of embodiments, the mini-cartridge datum is split between the top surface of the baseplate and the bottom surface of the baseplate. That is, at least one of the three reference points defining the mini-cartridge reference plane is on the top surface of the baseplate and at least one of the three reference points is on the bottom surface. In the split datum embodiments, one or more reference points on the top surface of the baseplate are forced in one direction onto corresponding fixed drive chassis reference points and one or more reference points on the bottom surface of the baseplate are forced in the opposite direction onto corresponding fixed drive chassis reference points. In a second set of embodiments, all three reference points defining the mini-cartridge reference plane are on the bottom surface of the mini-cartridge baseplate.

Force toward the bottom of the baseplate is provided by pressure onto the plastic top cover of the cartridge. Pressure onto the top plastic cover is provided by a flat friction surface, spring loaded rollers, wheels, or spring loaded spherical balls. In one embodiment, a flat friction surface toggles between two force levels to permit a low force required for cartridge insertion while also providing a high force for cartridge latching. In one embodiment, stepped diameter rollers provide guidance during mini-cartridge insertion as well as alignment and latching force after insertion.

In split datum embodiments, lower rollers or cam surfaces press onto the bottom surface of the baseplate to provide forward pressure for alignment of the front surface of the baseplate and upward pressure for the baseplate top surface reference points. In baseplate bottom surface datum embodiments, lower rollers or cam surfaces press onto the top surface of the baseplate to provide forward pressure for alignment of the front surface of the baseplate and downward pressure for the baseplate bottom surface datum.

BRIEF DESCRIPTION OF THE DRAWINGS

FIG. 6A is a cutaway right side view of a chassis having a toggling flat spring apparatus for alignment force on either old or new mini-cartridges and with a mini-cartridge partially inserted.

FIG. 6B is a cutaway side view of the chassis and toggling flat spring apparatus of FIG. 6A with the mini-cartridge further inserted.

FIG. 6C is a cutaway side view of the chassis and toggling flat spring apparatus of FIG. 6A with the mini-cartridge fully inserted.

FIG. 9A is a right side view of a mini-cartridge (either old or new) and a cut away left side view of a chassis roller apparatus illustrating an embodiment of a lower roller alignment apparatus in conjunction with reference points as illustrated in FIG. 4.

DETAILED DESCRIPTION OF THE PREFERRED EMBODIMENT OF THE INVENTION

The following industry conventional direction definitions will be used in this application. The face of a mini-cartridge having an access hole for a magnetic head is the front of the cartridge. The face of a drive having a opening for accepting a mini-cartridge is the front of the drive. When a mini-cartridge is inserted into a drive, front reference points of the cartridge align with rear reference points of the drive and rear reference points of the cartridge align with front reference points of the drive. For either a mini-cartridge or a drive, the right side is the right-hand side in a top view with the front at the top of the page. Therefore, in perspective views combining mini-cartridges and drives, front-rear and left-right for the mini-cartridge is opposite that for the drive. For example, in a top-rear-right perspective of a cartridge (being inserted in a drive), the view is of the rear-right of the mini-cartridge but of the front-left of the drive.

Figure 1A:
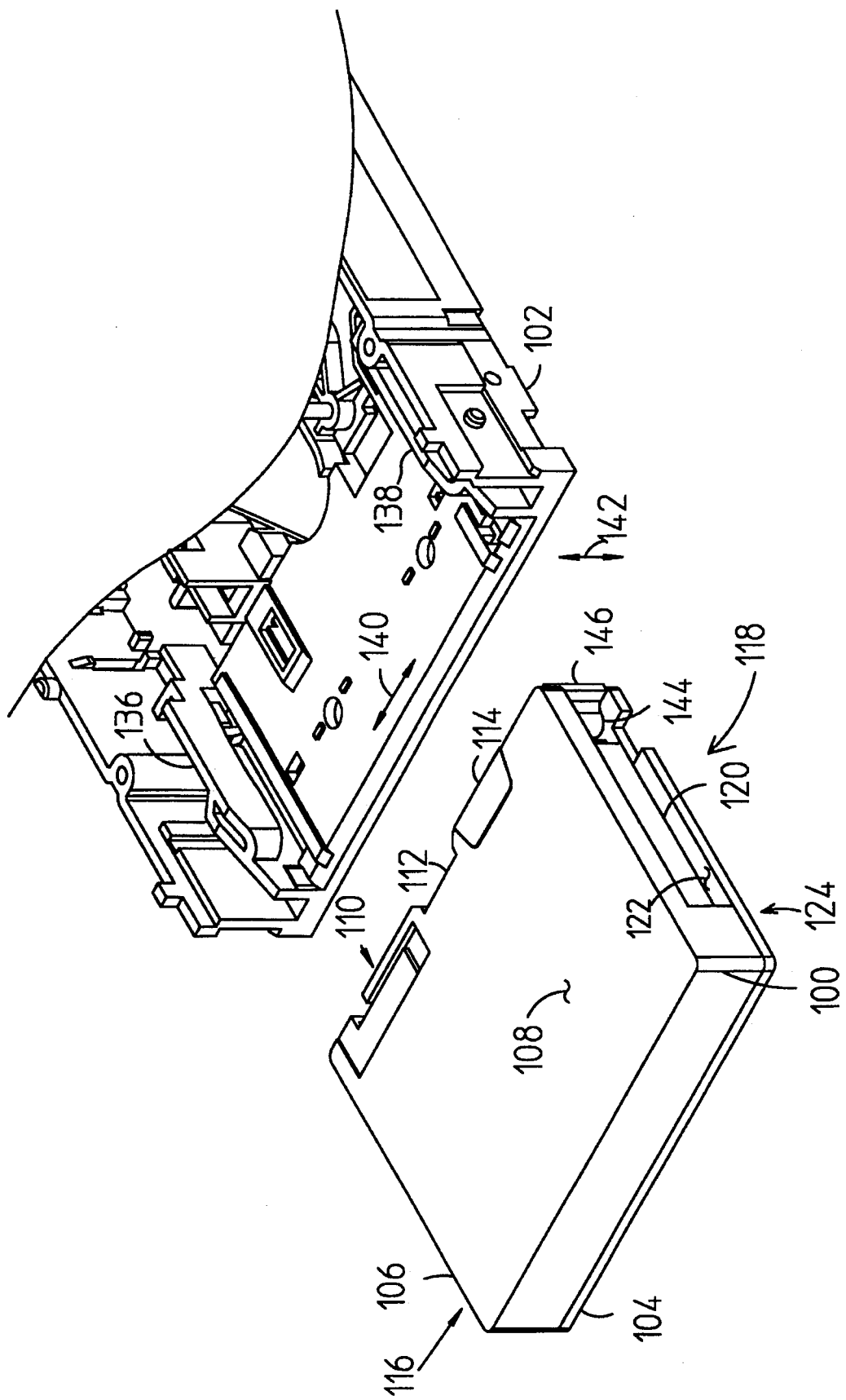
FIG. 1A (prior art) is a top-rear-right perspective view of a prior art mini-cartridge and a portion of a compatible drive chassis.
Figure 2A:
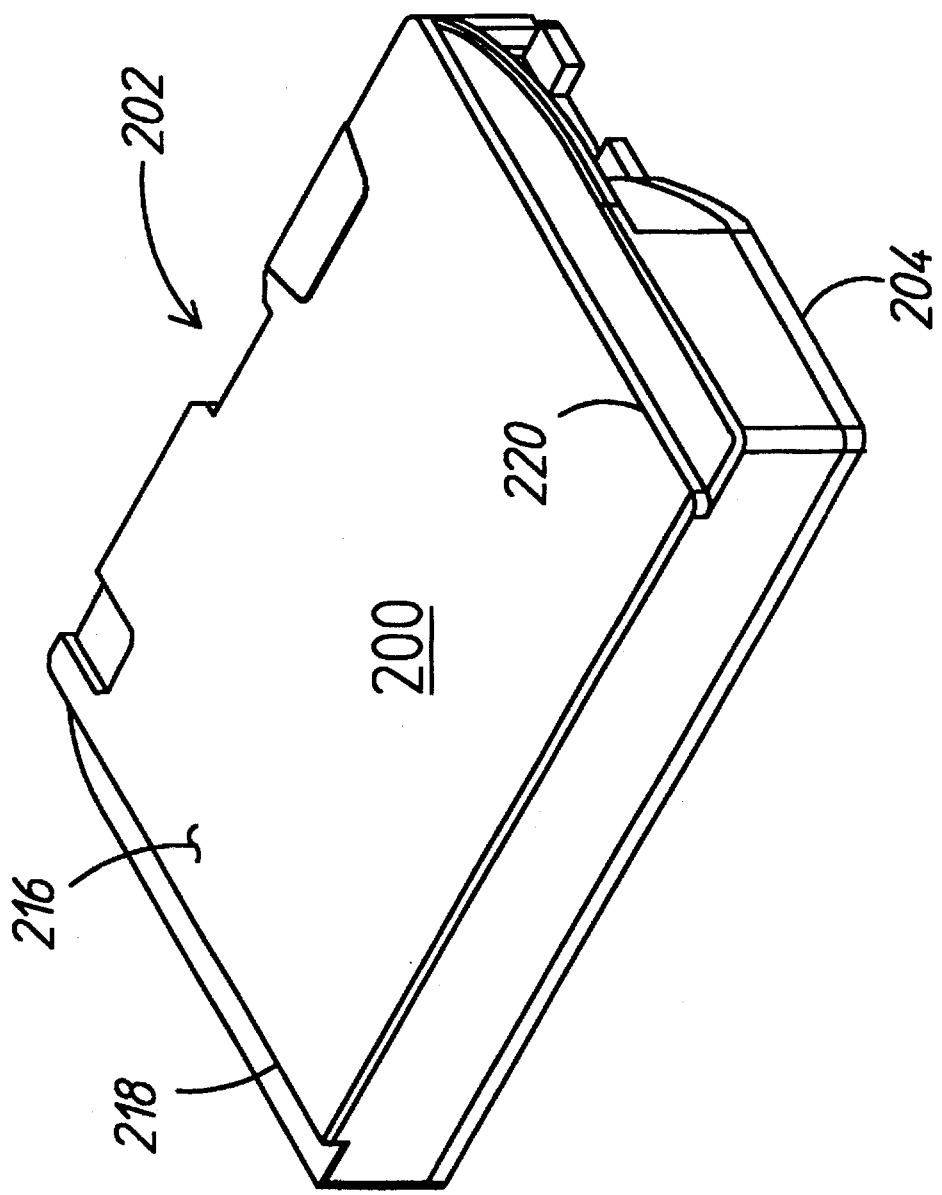
FIG. 2A is a top-rear-right perspective view of a new mini-cartridge.

FIG. 2A illustrates a new mini-cartridge 200. The new mini-cartridge has a front surface 202 that is dimensionally identical to front surface 110 (FIG. 1A) of the older mini-cartridges. All other surfaces are modified to enable larger tape reels. The plastic top 216 has steps 218 and 220. The distance between steps 218 and 220 is identical to the width of the older mini-cartridges (100). The height of the new mini-cartridge between steps 2 18 and 220 is identical to the height of the older mini-cartridges. The height of the shoulders beyond the steps 218 and 220 is less than the height of the older mini-cartridges. The invention provides methods and mechanisms enabling the drive to align and latch both the original mini-cartridges as illustrated in FIG. 1A and the new mini-cartridges as illustrated in FIG. 2A.

Figure 1B:
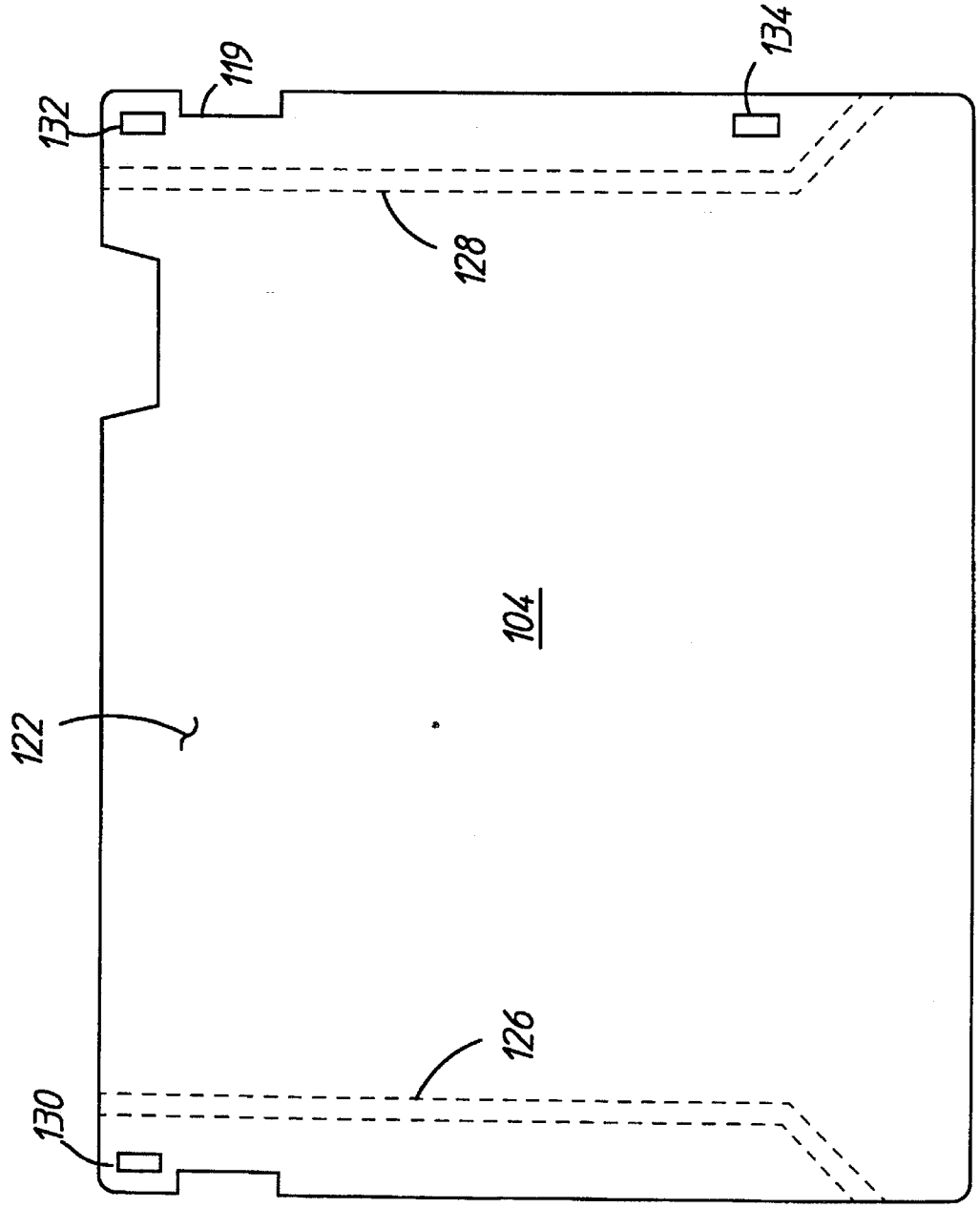
FIG. 1B (prior art) is a top plane cut-away view of the baseplate of the mini-cartridge illustrated in FIG. 1A.
Figure 2B:
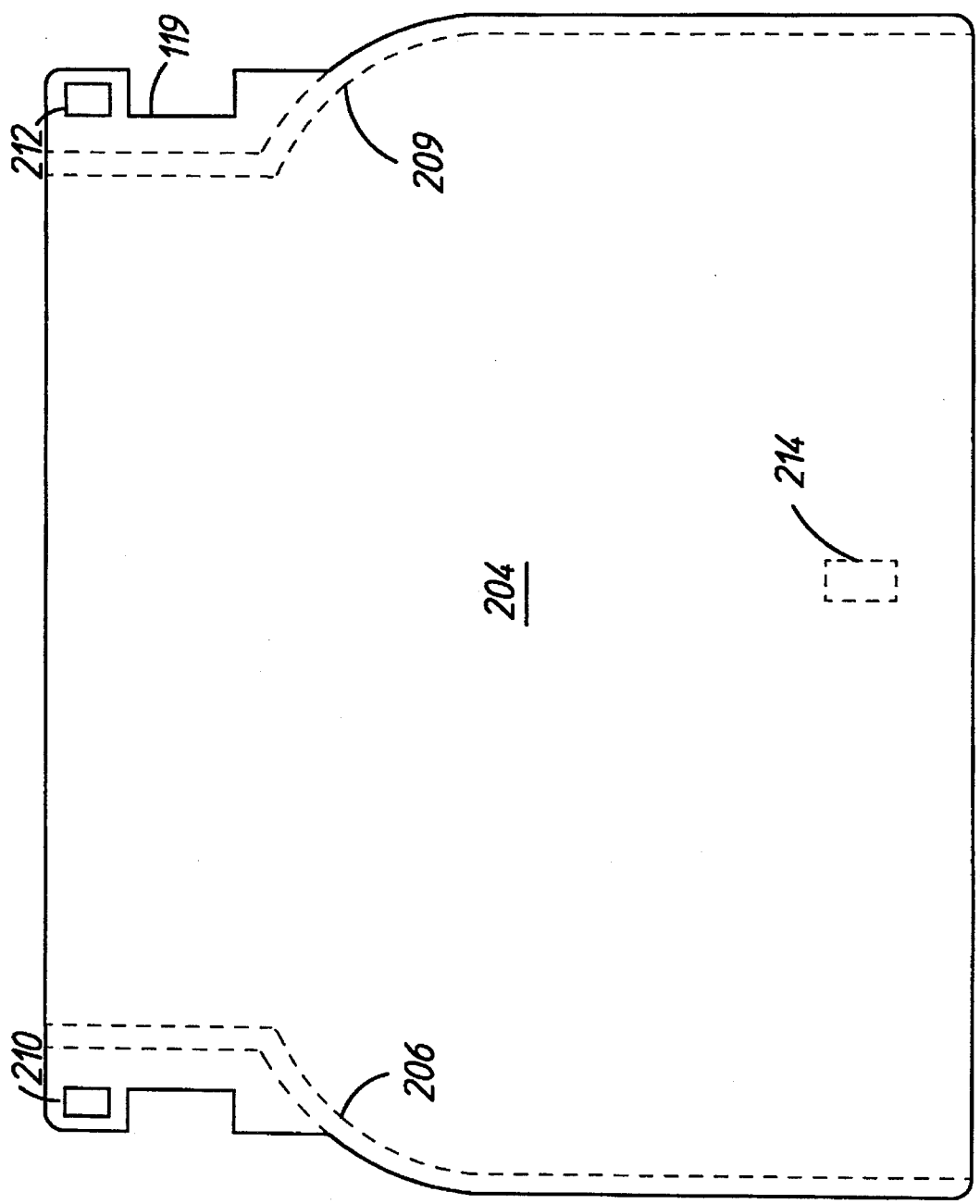
FIG. 2B is a top plane cut-away view of the baseplate of the new mini-cartridge of FIG. 2A.

FIG. 2B is a top view of the metal base plate 204 of the mini-cartridge of FIG. 2A. Dashed lines 206 and 208 indicate the location of the plastic side walls of the mini-cartridge of FIG. 2A. Reference points 210 and 212 (FIG. 2B) correspond to reference points 130 and 132 (FIG. 1B), respectively. Note, however, in FIG. 2B, the area corresponding to reference point 134 (FIG. 1B) is not exposed. Note also that the exposed area is very limited. If a new third reference point is defined somewhere in the exposed top surface of the baseplate, substantial clamping force may be required to ensure adequate latching for vibration and mechanical shock. Therefore, an alternative datum must be defined for alignment of the plane of the baseplate in a direction perpendicular to the plane of the baseplate.

One alternative is to split the datum, using both the top and bottom surfaces of the metal baseplate. For example, the two front reference points 210 and 212 can remain on the top surface of the baseplate and a rear reference point 2 14 can be defined on the bottom surface of the baseplate. Preferably, the rear reference point should be placed as rearward as possible to provide firm support of the mini-cartridge mass during vibration and mechanical shock. However, drive chassis doors or other parts may limit placement of the rear reference point.

Figure 3:
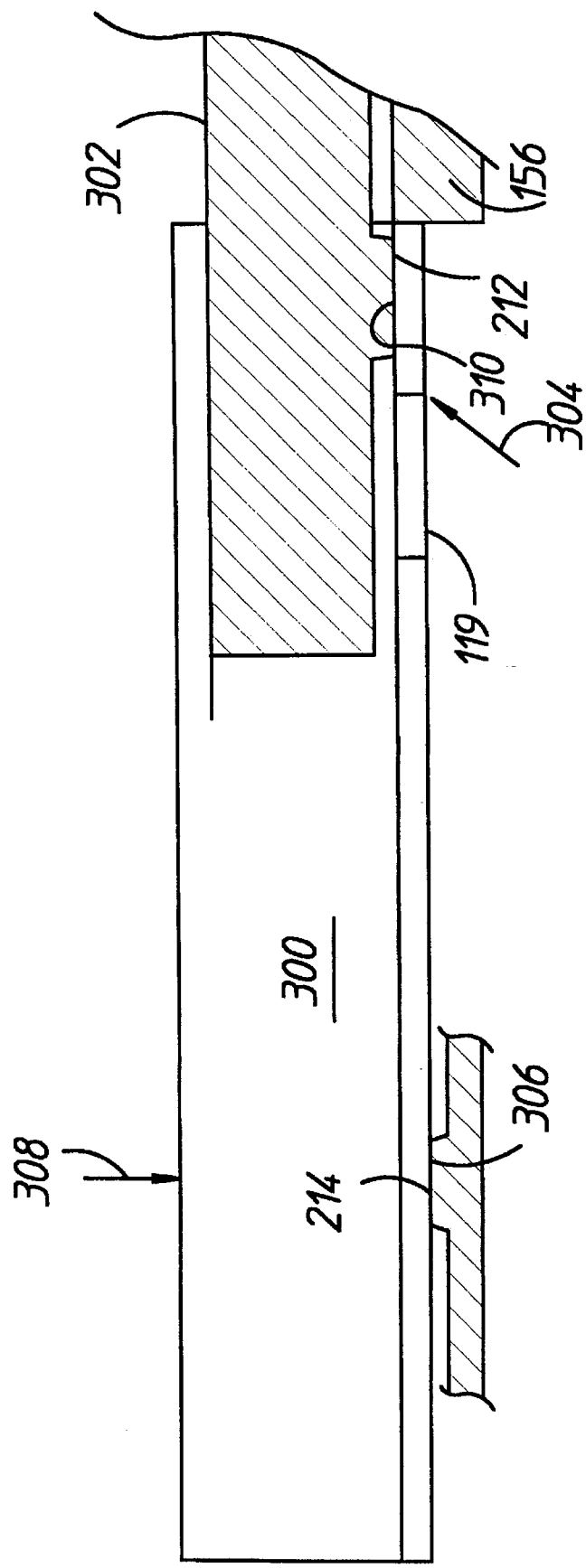
FIG. 3 is a right side view of a portion of a mini-cartridge (either old or new) and a cut-away side view of a portion of a chassis illustrating one embodiment of reference points on both the new mini-cartridge and the chassis.

FIG. 3 is a side view of a mini-cartridge 300 (either old or new) illustrating the alignment and latching forces required from the drive to accommodate a split datum (as illustrated in FIG. 2B). If the datum is split, then one or more reference points on the top surface of the baseplate must be forced in one direction onto corresponding fixed drive chassis reference points and one or more reference points on the bottom surface of the baseplate must be forced in the opposite direction onto corresponding fixed drive chassis reference points. For example, in FIG. 3, a chassis guide 302 provides a drive rear reference surface 310 corresponding to baseplate front reference point 212 (or FIG. 1B, 132). For mini-cartridge front reference points 210 and 212 (or FIG. 1B, 130 and 132) and chassis stops 156, an upward and forward force is needed as illustrated by arrow 304. Baseplate rear reference point 2 14 is defined on the bottom of the baseplate and a corresponding drive front reference point 306 is defined on the drive chassis. Note that the mini-cartridge baseplate is rigid and that only three points are needed to define a plane. However, the drive chassis may be relatively flexible and it may be desirable to define four reference points (two in the front and two in the rear) for better support by the drive chassis. Therefore, reference point 214 may be a single point as illustrated by reference point 214 in FIG. 2B or may be one of a pair of reference points. For reference point 214, downward force is required as illustrated by arrow 308. For convenience, force 308 may be on the plastic top of the mini-cartridge.

An alternative datum definition is to place all the baseplate reference points on the fully exposed bottom surface of the metal baseplate. If the datum is moved entirely onto the bottom surface of the baseplate, then the drive must force the bottom surface of the baseplate against corresponding drive chassis reference points in a direction that is opposite that of current drives for the older mini-cartridges.

Figure 4:
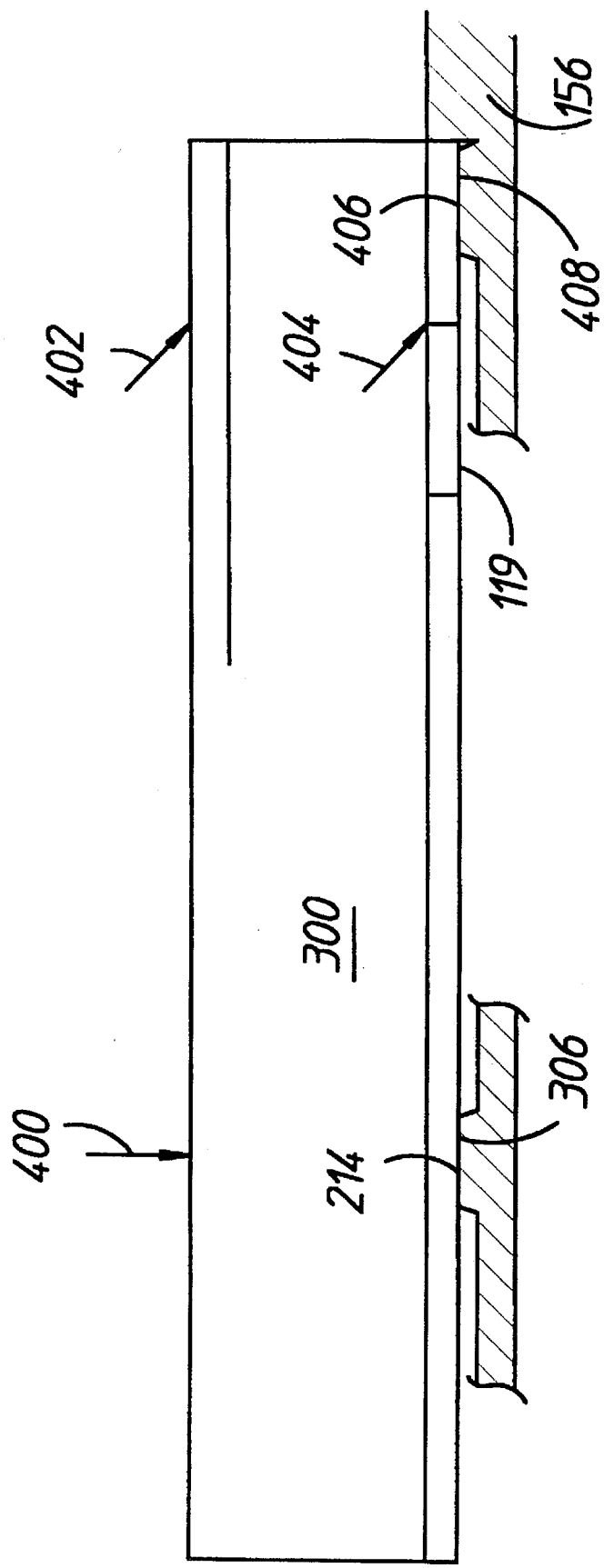
FIG. 4 is a right side view of a portion of a mini-cartridge (either old or new) and a cut-away side view of a portion of a chassis illustrating an alternative embodiment of reference points on both the new mini-cartridge and the chassis.

FIG. 4 is a side view of a mini-cartridge 300 (either old or new) illustrating the alignment and latching forces required from the drive to accommodate a datum defined entirely on the bottom surface of the baseplate. In FIG. 4, reference point 406 is defined on the bottom surface of the baseplate, opposite reference point 212 on the top surface. A chassis reference point or surface 408 corresponds to mini-cartridge reference point 406. Mini-cartridge reference points 406 and 214 must both be pressed down against corresponding chassis reference points 408 and 306, respectively. Vertical force 400 on the plastic top provides alignment and clamping for reference points 214 and 306. Force 402 on the plastic top provides both vertical force for reference points 406 and 408 and forward force to press the front of the metal baseplate against chassis stops 156. Alternatively, force 404 on the exposed portion of the top surface of the baseplate provides both vertical and forward force. Preferably, a combination of force 400 and force 402 or a combination of force 400 and force 404 is used to ensure adequate latching force against at least three widely separated reference points and the chassis stops 156.

Figure 5A:
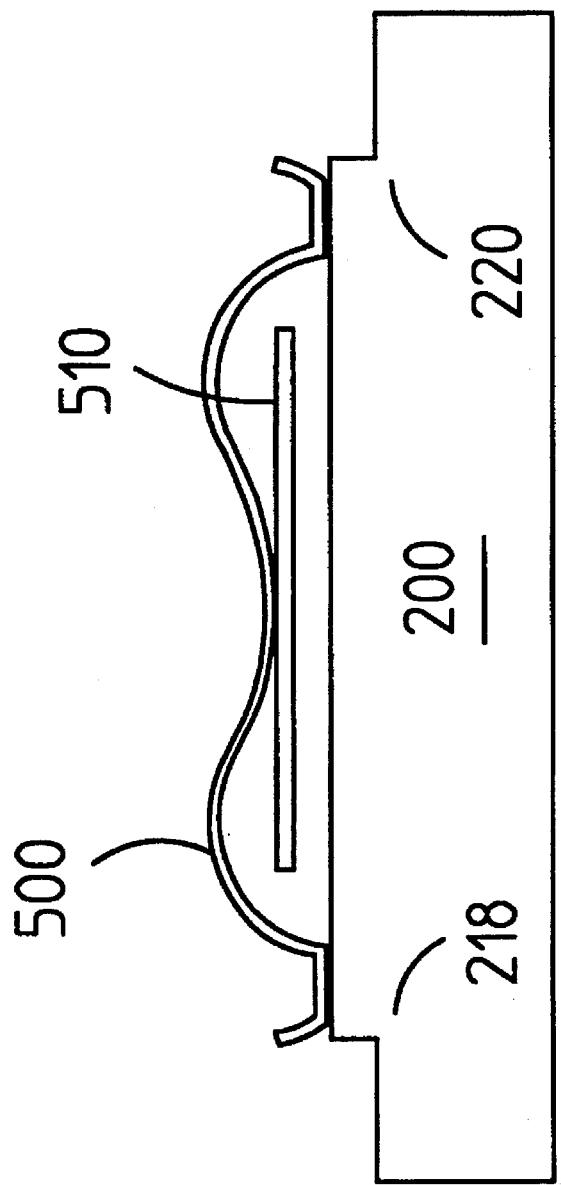
FIG. 5A is a front view of a chassis having a cantilevered flat spring apparatus for alignment force on either old or new mini-cartridges.

In general, a spring-loaded contact is needed for force 308 (FIG. 3) or force 400 (FIG. 4). One low cost and easily manufacturable spring-loaded contact mechanism is a simple flat (leaf) spring. FIG. 5A illustrates a rear view of a new bracket 510 is attached to the chassis walls (not illustrated). A single piece of spring material may be attached centrally onto a bracket 510 as illustrated or two separate pieces of spring material may be individually mounted onto a bracket or directly onto the chassis side walls. Preferably, the areas of spring 500 that make contact with a mini-cartridge plastic top cover (areas 506 and 508) are coated with plastic or with a low friction material such as Teflon to reduce scratching of the plastic top cover and to reduce insertion force. For new mini-cartridges, the height between steps 218 and 220 is identical to the height of the older mini-cartridges. Therefore, spring 500 provides an identical vertical alignment and latching force for both old and new mini-cartridges.

Figure 5B:
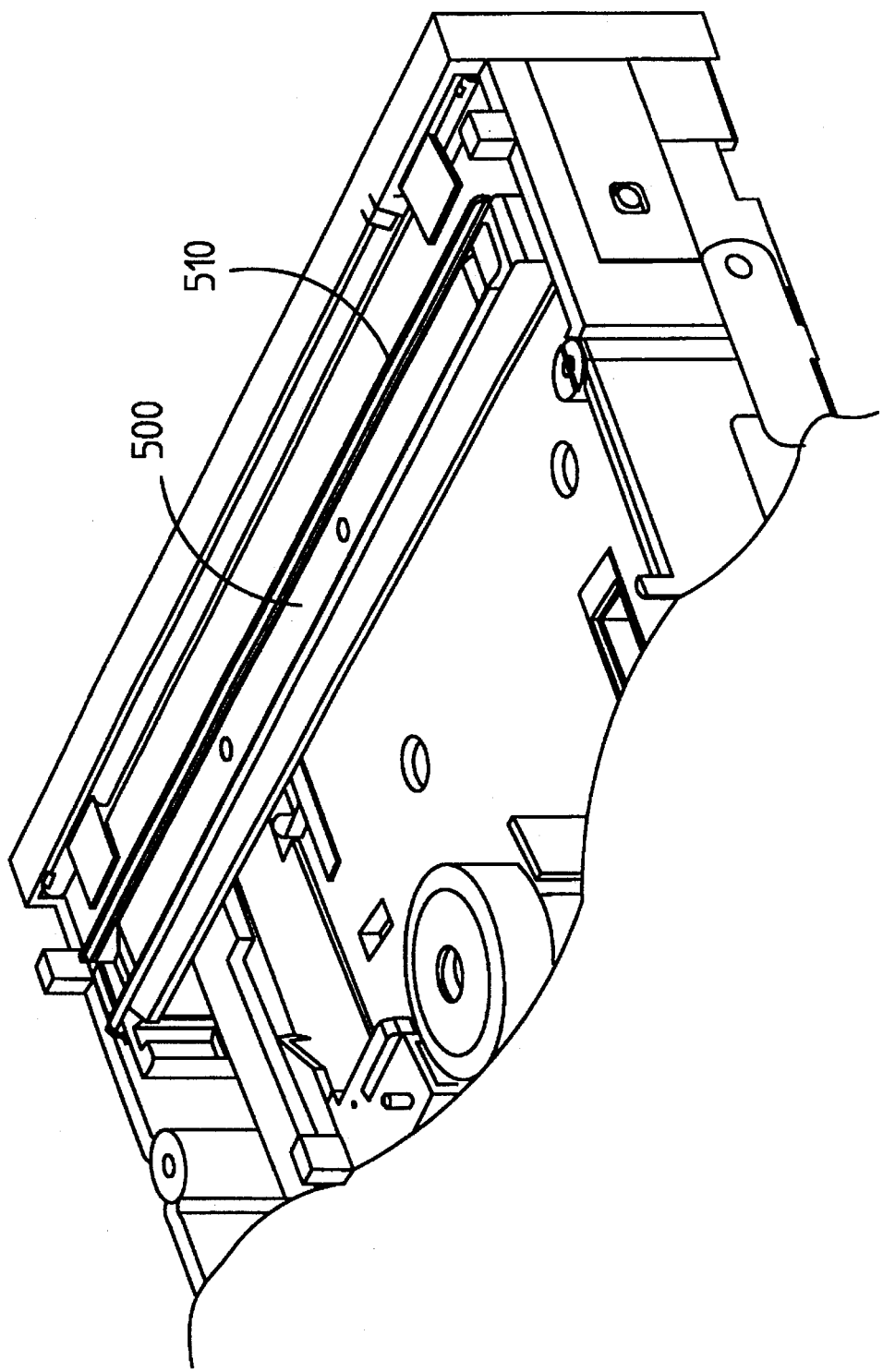
FIG. 5B is a top-rear-right perspective view of the chassis and cantilevered flat spring apparatus of FIG. 5A.

FIG. 5B is perspective view of an embodiment of spring 500 and bracket 510 illustrated in FIG. 5A with additional detail. In the embodiment illustrated, bracket 510 is formed sheet metal with stiffening ribs running most of its length, with attachment features for the leaf spring 500 and attachment features for mounting onto the chassis. Cutouts enable the leaf spring 500 to protrude through the bracket 510. The leaf spring 500 is attached to the bracket 510 near the center of the bracket. Formed features of leaf spring 500 rub against the top of the mini-cartridge top cover.

The leaf spring embodiment of a spring-loaded contact of FIGS. 5A and 5B creates some insertion force relatively early during insertion of the mini-cartridge into the drive. In addition, after the mini-cartridge is fully inserted, the vertical force is only on the central (measured front to back) area of the mini-cartridge. That is, the embodiment of FIGS.

5A and 5B provides force 308 (FIG. 3) or force 400 (FIG. 4) but not the vertical component of force 402 (FIG. 4). FIGS. 6A–6D illustrate a leaf spring embodiment that generates very little force until the mini-cartridge is almost fully inserted and then after full insertion, provides force on both the front (vertical component force 402, FIG. 4) and central areas (force 308, FIG. 3 or force 400, FIG. 4) of the mini-cartridge.

Figure 6D:
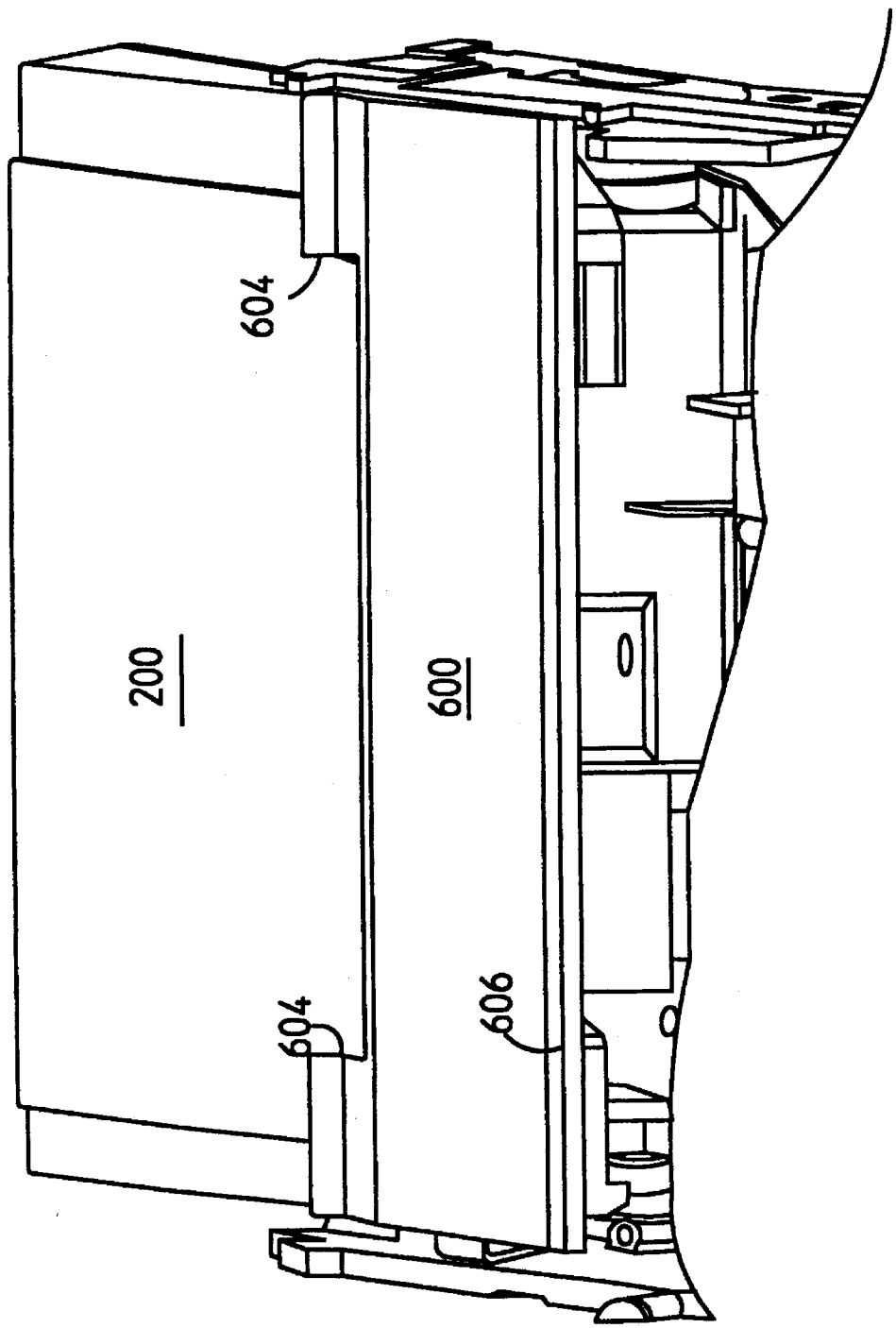
FIG. 6D is a top-rear-right perspective view of the chassis and toggling flat spring apparatus of FIGS. 6A–6C.

In FIG. 6A, a leaf spring 600 has a formed area 604, a pivoting mounting point 602 and stiff rear edge 606. As a mini-cartridge (old 100 or new 200) is inserted, the mini-cartridge initially pivots the spring 600 out of the way (FIG. 6A). As the mini-cartridge is inserted further into the drive resistance from spring 600 at a point 608 (FIG. 6B) behind the pivot point 602. With insertion beyond point 608, the mini-cartridge starts pushing the rear area of spring 600 upward causing spring 600 to pivot around pivot point 602, forcing formed area 604 against the mini-cartridge. When the mini-cartridge is fully inserted (FIG. 6C), both the rear edge 606 and the formed area 604 are deflected upward from their undetected positions relative to the pivot point 602. As a result, vertical force is provided at edge 606 (which is on the forward area of the cartridge 300) and at the formed area 604 (which is on the central area of the cartridge 300). FIG. 6D is a perspective view illustrating a new mini-cartridge 200 fully inserted in a drive having a pivoting spring 600. Note that the rear edge 606 of spring 600 is folded. The fold provides rigidity to prevent sagging, reduces snagging of the mini-cartridge top cover during mini-cartridge extraction, tends to make the force of the spring more uniformly distributed across the contact area with the top cover of the mini-cartridge, and reduces the risk of cuts from sharp edges exposed at the edge of the part. Note that rollers may be added in the folded area 604 or at point 608 or both to reduce friction between the spring and the cartridge and to reduce wear on the cartridge cover.

Figure 7A:
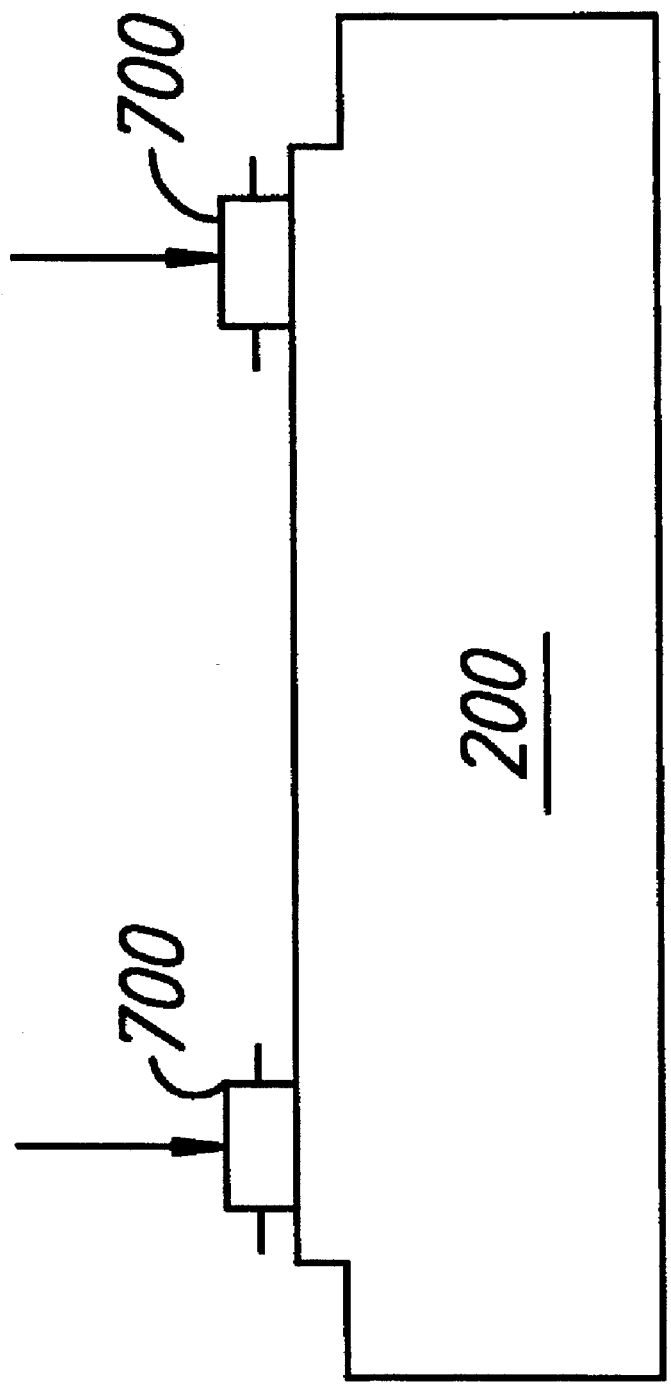
FIG. 7A is a front view of a chassis having top rollers for alignment force on either old or new mini-cartridges.

The spring-loaded contact embodiments of FIGS. 5A–6D all result in some friction related insertion force and rubbing of the mini-cartridge plastic top cover. The friction and rubbing can be substantially reduced by using rollers, wheels or balls. In general, in this application, the word roller may be interchanged with the word wheel. FIG. 7A illustrates vertical force being applied through two cylindrical spring loaded rollers 700.

Figure 7B:
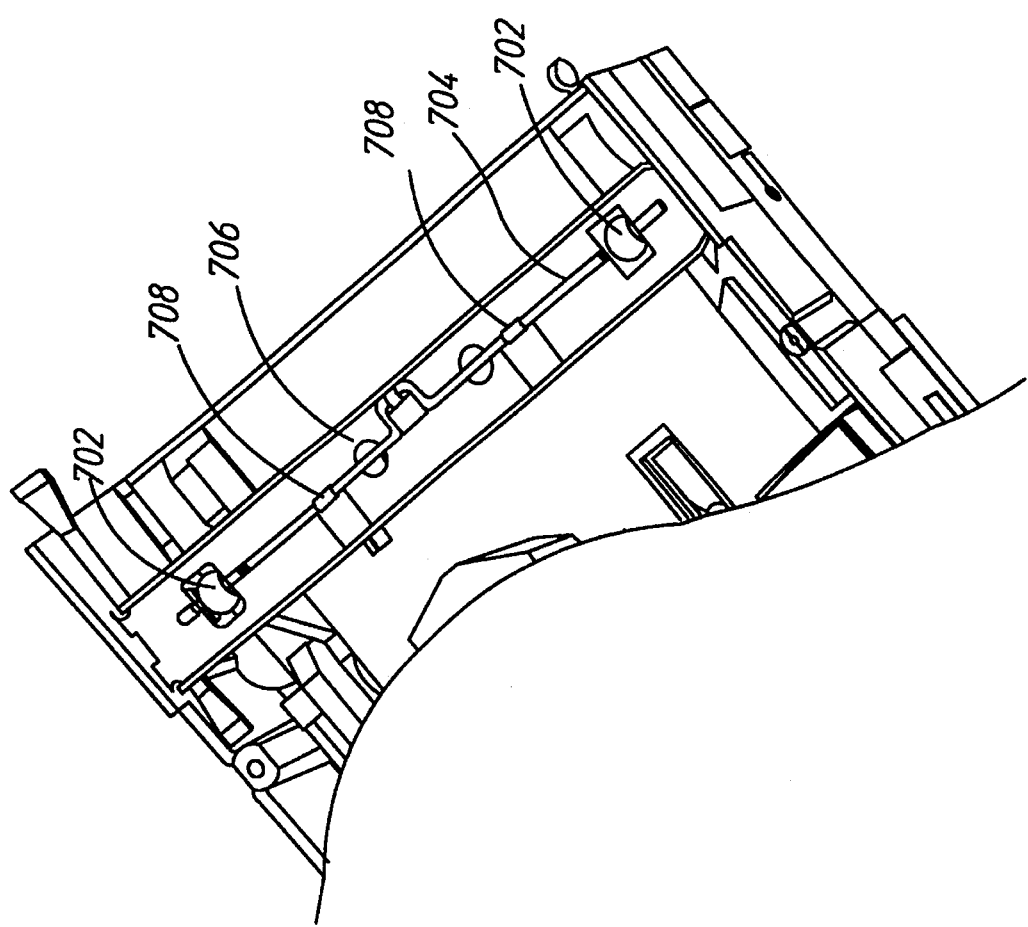
FIG. 7B is a top-rear-right perspective view of a chassis having top rollers as in FIG. 7A in an embodiment having spherical rollers on cantilevered springs.

FIG. 7B illustrates an embodiment of FIG. 7A using spherical rollers 702 on a cantilevered wire spring 704. In general, in an axial cantilever spring arrangement, the rollers tend to ride on one edge when loaded against a mini-cartridge because the rollers are only supported on one side. Therefore, with the cantilever spring arrangement illustrated in FIG. 7B, spherical, radially crowned rollers, or taper crowned rollers are preferred to ensure that the rolling parts always rest on the main body of the roller rather than on one edge. These non-cylindrical rollers are also useful in minimizing the height of the chassis. If cylindrical rollers ride on an edge, their effective height as viewed in a side or front view becomes greater, thereby adding difficulties to designing for minimal chassis height. Note that in the present application, in each of the roller configurations other than that of FIG. 7B, the rollers are illustrated as cylindrical but in general may also be spherical, radially crowned or taper crowned.

The embodiment of FIG. 7B has the advantage of being easy to tool for production. The wire spring 704 is attached to a formed sheet metal bracket 706 having stiffening ribs running most of its length. Cutouts enable the rollers 702 to protrude through the bracket 706. Folded metal tabs 708 anchor one end of the cantilevered portions of the springs. The cylindrical rollers have no hubs and the rollers are free to slide axially in the direction of the spring. Metal tabs projecting downward at the sides of the cutouts limit the axial travel of the rollers.

Figure 7C:
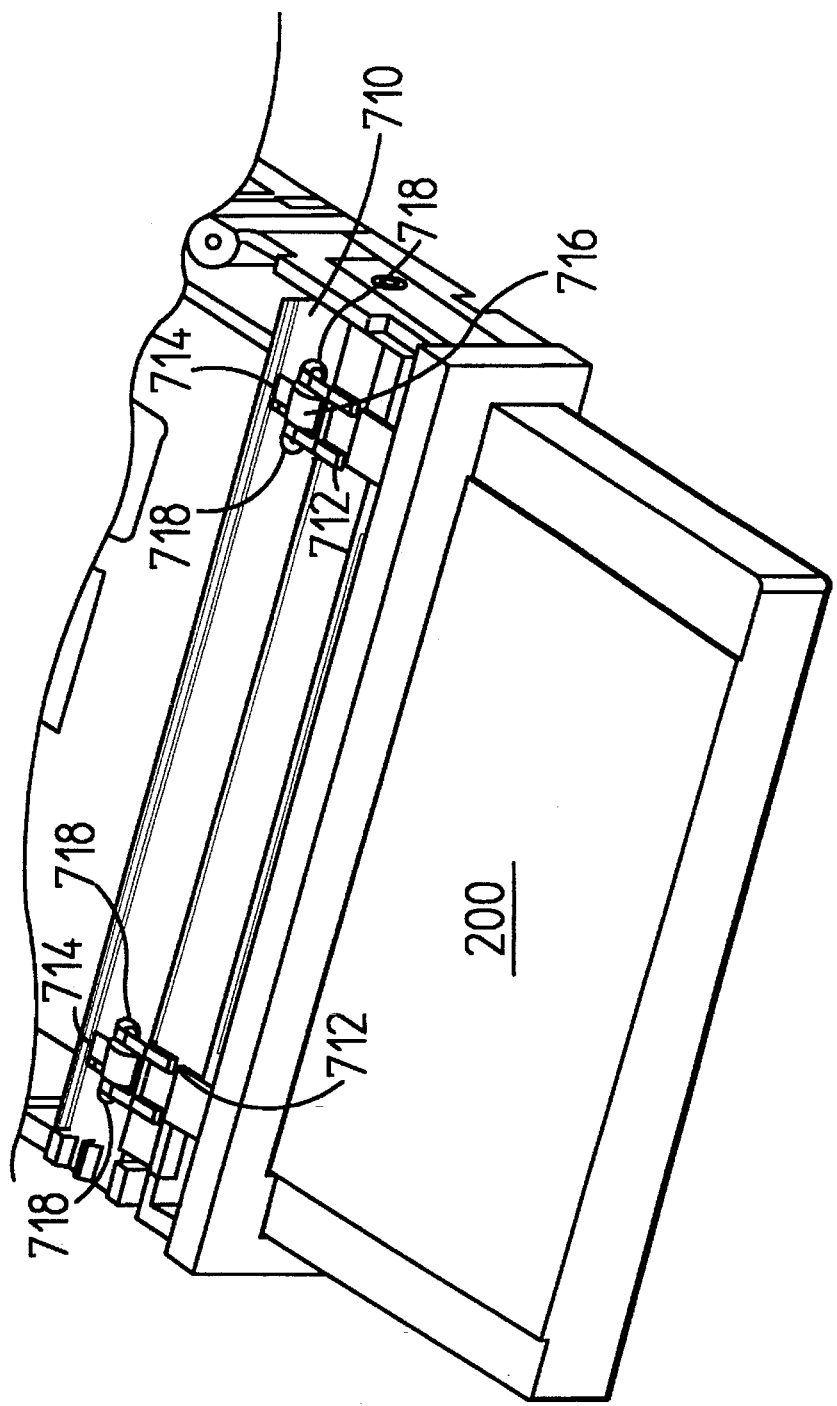
FIG. 7C is a top-front-left perspective view of a chassis having top rollers as in FIG. 7A in an embodiment having cylindrical rollers mounted in a deep-drawn bracket.

FIG. 7C illustrates an embodiment that potentially has a lower unit manufacturing cost relative to the embodiment of FIG. 7B but more expensive (and time consuming) to tool for high volume production parts. The embodiment of FIG. 7C supports the rollers equally on either side of each roller thereby enabling the use of cylindrical rollers. A formed sheet metal bracket 710 has stiffening ribs running most of its length except for two areas where leaf springs 712 are formed. Cutouts 714 enable cylindrical rollers 716 to protrude through the bracket. The bracket 710 in the embodiment of FIG. 7C has two deep drawn areas 718 for each roller that form notches for the axles of the rollers. Separate leaf springs could be provided to hold the axles in the notches and to provide the vertical alignment force. However, in the embodiment illustrated in FIG. 7C, part of the bracket material is folded to form a leaf spring 712, eliminating the cost of separate springs. Leaf spring 712 contacts the roller axles providing a downward load.

Referring back to FIG. 5A, recall that the height of the new mini-cartridge 200 between steps 218 and 220 is identical to the height of the original mini-cartridge 100 (FIG. 1A). The new mini-cartridge 200 has shoulders at a slightly lower height. Steps 218 and 220 can be used to help center (along direction 140, FIG. 1A) the new mini-cartridge relative to the drive opening during insertion. In the embodiment illustrated in FIGS. 8A and 8B, stepped (dual-diameter) rollers are used for guides for both old and new mini-cartridges during mini-cartridge insertion as well as for vertical alignment and latching force after mini-cartridge insertion.

Figure 8A:
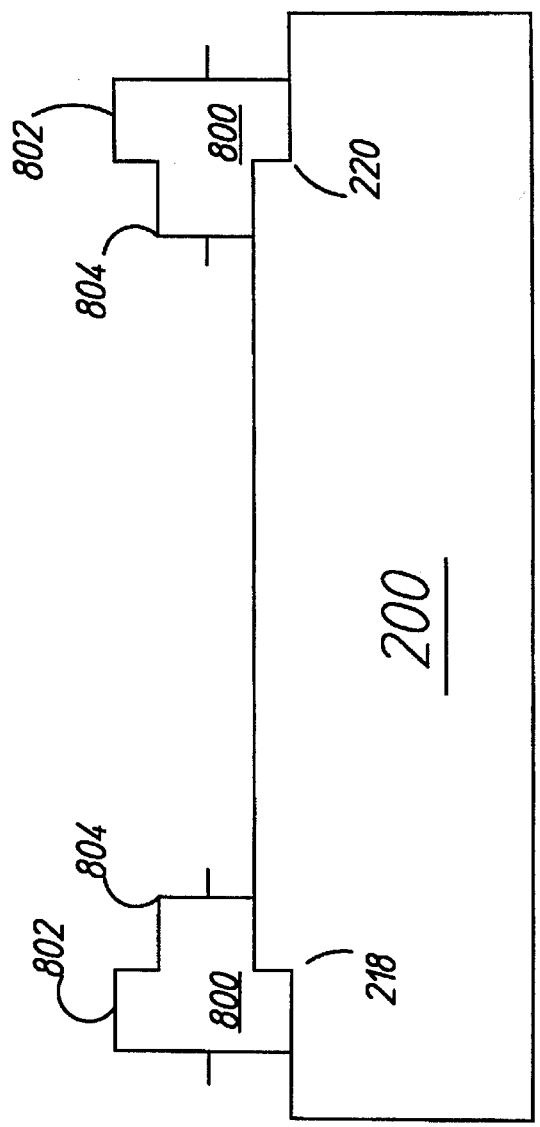
FIG. 8A is a front view of a chassis having top rollers in an embodiment in which stepped rollers provide both alignment force and insertion guidance, and illustrated in use with the new mini-cartridge of FIG. 2A.

FIG. 8A illustrates a new mini-cartridge 200 inserted into a drive having stepped rollers 800. Each stepped roller 800 has a large diameter section 802 and a small diameter section 804. The rollers may be mounted in a bracket similar to bracket 710 in FIG. 7C. The larger diameter roller section 802 provides vertical force onto the new mini-cartridge top cover. The steps 218 and 220 on the top surface of the mini-cartridge top cover are guided during insertion by the inner surfaces of the larger diameter section 802 of the rollers.

Figure 8B:
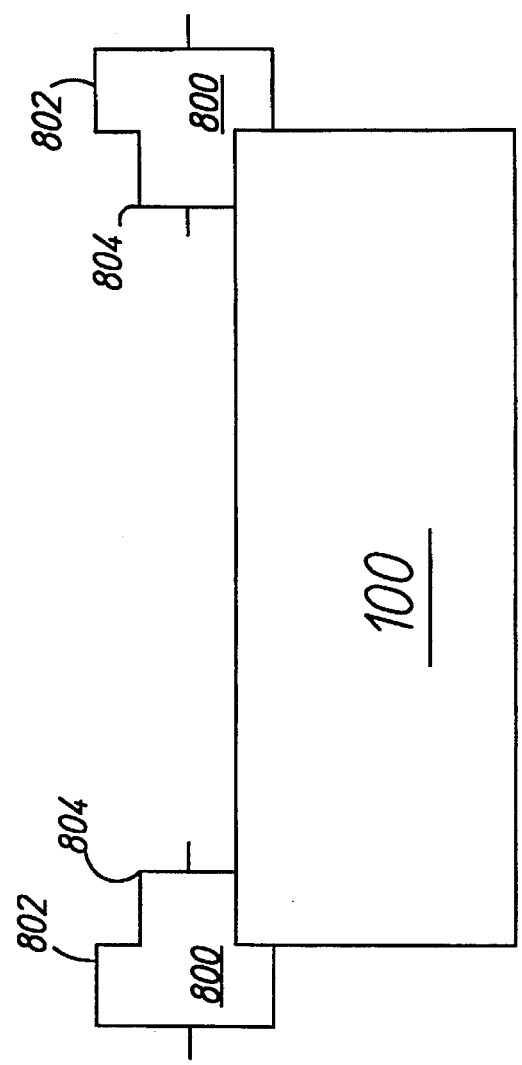
FIG. 8B is a front view of the chassis and stepped top rollers of FIG. 8A in use with the old mini-cartridge of FIG. 1A.

FIG. 8B illustrates an older mini-cartridge 100 inserted into a drive having the stepped rollers 800. The smaller diameter roller section 804 provides vertical force onto the older mini-cartridge top cover. The side surfaces of the older mini-cartridge top cover are guided during insertion by the inner surfaces of the larger diameter section 802 of the rollers.

Preferably, the diameters of the two roller sections 802 and 804 are selected so that when a new mini-cartridge 200 is inserted into a drive, only the large diameter section 802 is in contact with the plastic top cover (shoulders only). This enables the resulting vertical latching force to be greater for a new mini-cartridge 200 than for the older mini-cartridge 100 to compensate for the greater mass of the new mini-cartridge 200.

Figure 1C:
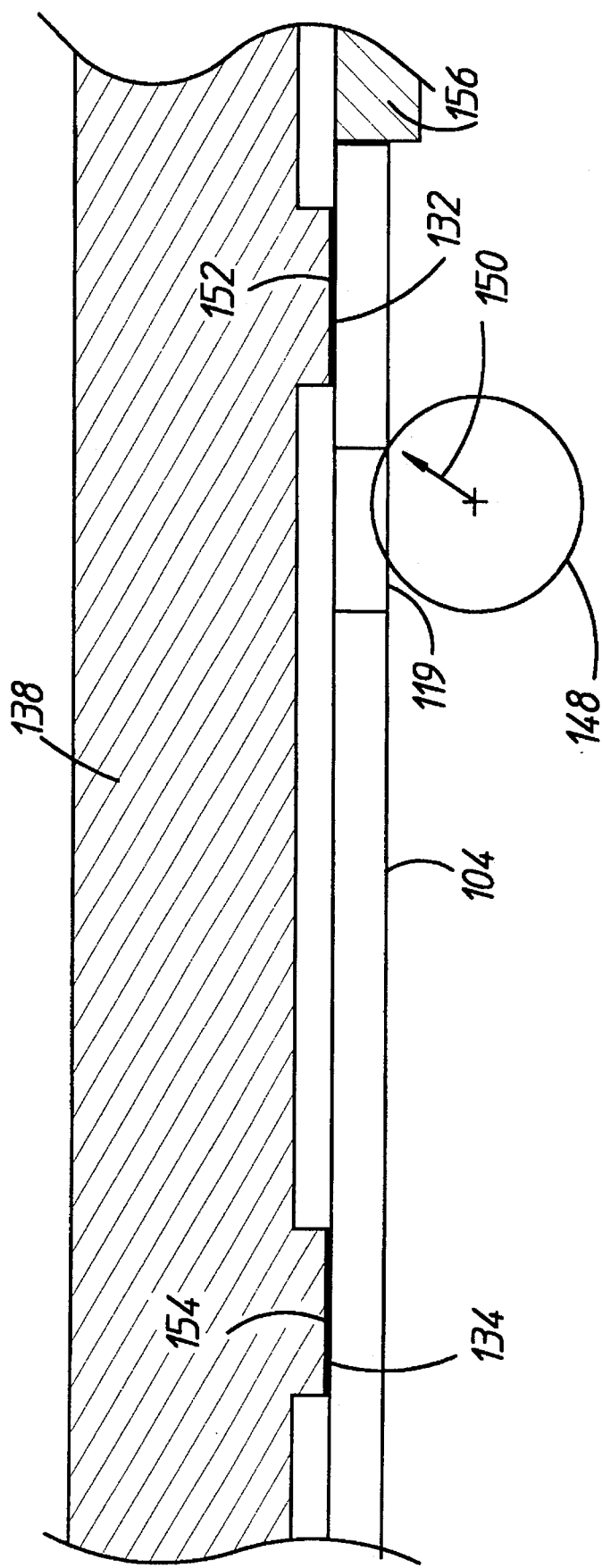
FIG. 1C (prior art) is a side view of a portion of the mini-cartridge of FIG. 1A and a cut-away side view of a portion of the chassis of FIG. 1A illustrating a feature in the chassis used for alignment of an inserted mini-cartridge.
Figure 9B:
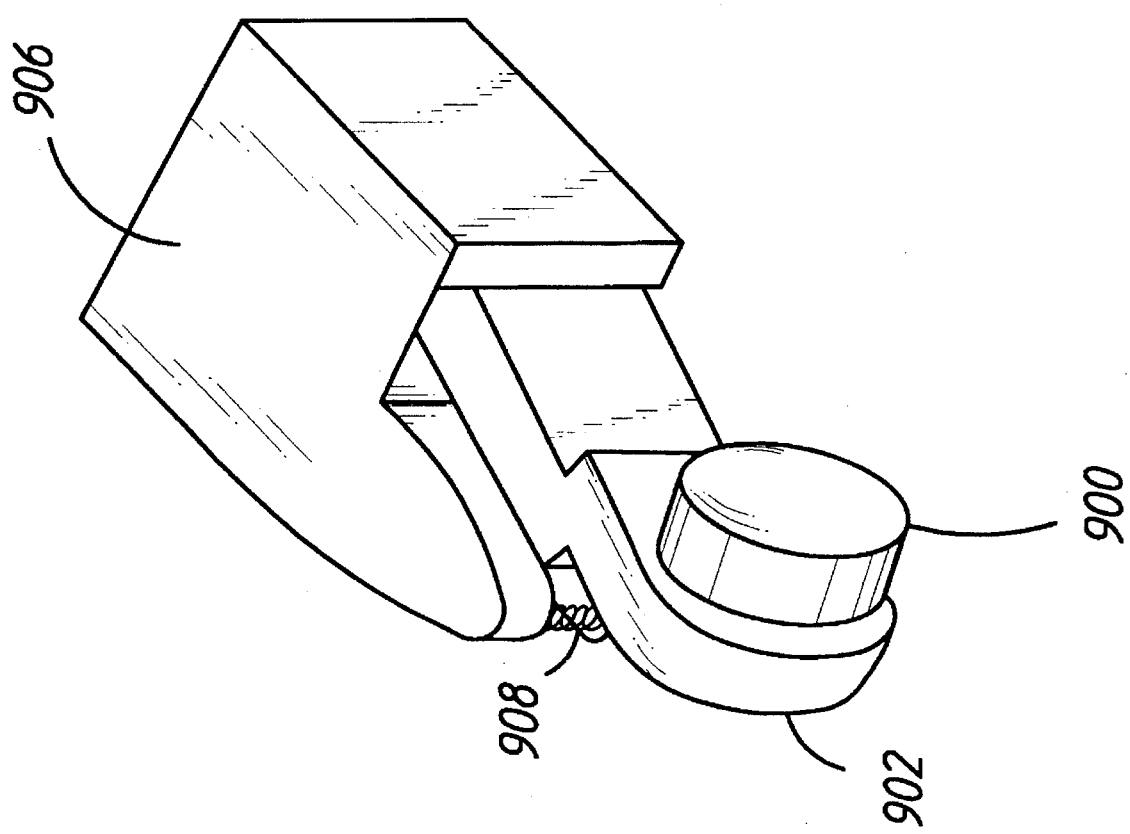
FIG. 9B is a top-front-left perspective of a lower roller as illustrated in FIG. 9A.

Referring back to FIGS. 3 and 4, any of the vertical force embodiments illustrated in FIGS. 5A–8B may be used for force 308 (FIG. 3) or force 400 (FIG. 4). Each of the embodiments of FIGS. 5A–5B and FIGS. 7A–8B must also be used in conjunction with force 304 (FIG. 3) for a split datum system or in conjunction with force 404 (FIG. 4) for a datum that is only on the bottom surface of the baseplate. Referring back to FIG. 1 C, a common prior art mechanism for force 304 (FIG. 3) is a spring loaded roller 148 that presses into a notch 119 in the side of the baseplate 104. FIGS. 9A and 9B illustrate an embodiment of a roller system providing vertical and forward force 404 (FIG. 4) onto the baseplate for a split-datum system.

FIG. 9A is a side view of a roller assembly including a wheel or roller 900 on a spring loaded arm 902 that pivots around a pivot point 904 attached to a fixed position bracket 906. The top of a compression spring 908 is secured by a pin on the bracket 906. The bottom of the compression spring 908 is secured by a pin on the lever arm 902. As a result, the spring 908 pushes the lever arm 902 downward. Forward force results from the roller 900 first pressing against the forward edge of the notch 119. Note that the roller 900 must be sized to fit between the baseplate and the protruding lip on the cartridge cover (see FIGS. 1A and 2A).

FIG. 9B is a top-front-left perspective view of the roller assembly for the left side of the mini-cartridge. That is, the roller assembly of FIG. 9B is the mirror image of the roller assembly of FIG. 9A.

Note that FIGS. 9A and 9B illustrate an embodiment using a compression spring 908. In an alternative embodiment, an extension spring may be used. That is, one end of an extension spring may be mounted near the bottom (as viewed in FIG. 9A) of bracket 906 and a second end attached near the top surface of lever arm 902 so that the extension spring pulls the lever arm 902 downward towards the cartridge baseplate.

Figure 10B:
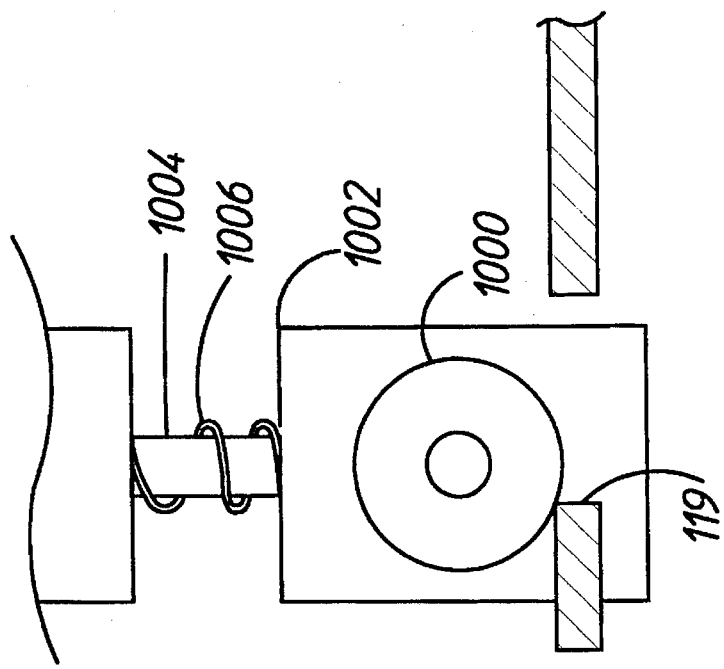
FIG. 10B is a left side view of the roller apparatus of FIG. 10A.
Figure 10A:
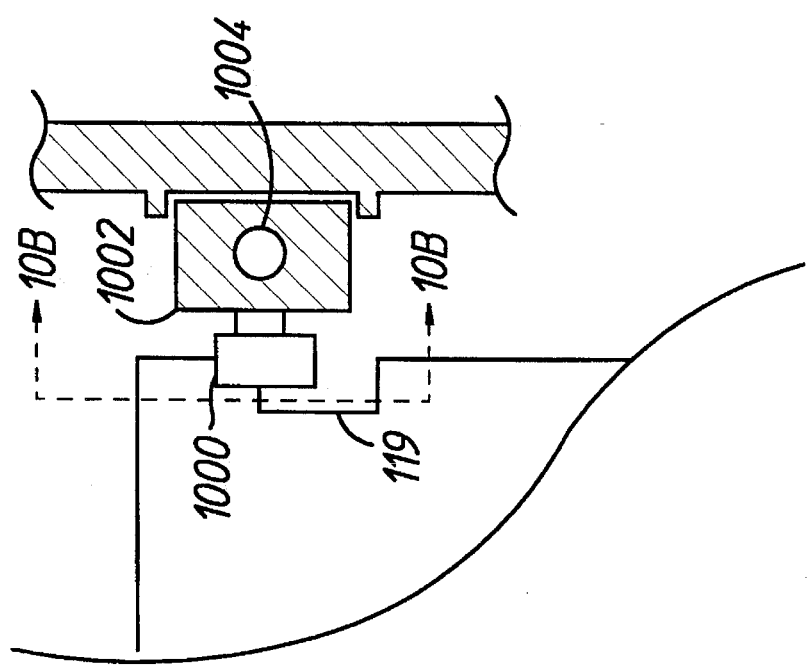
FIG. 10A is a cut away top view of the top surface of the baseplate of a mini-cartridge (either old or new) and a portion of a chassis roller apparatus illustrating an alternative to the configuration of FIGS. 9A and 9B for alignment force as illustrated in FIG. 4.

FIG. 10A is a top view of the top surface of the baseplate of a mini-cartridge 300 along with a roller arrangement that is free to move substantially vertically instead of around a pivot as illustrated in FIGS. 9A and 9B. Roller 1000 is attached to a sliding block 1002 that slides on a pin 1004. Rotation of the block may be controlled by features in the chassis side wall as illustrated or by the shape of the pin 1004.

FIG. 10B is a left side view of the roller arrangement of FIG. 10A. Note that a spring 1006 forces the block 1002 and roller 1000 against the front edge of notch 119, providing vertical and forward force. A compression spring is illustrated but the configuration may be readily adapted to use an extension spring instead of a compression spring. Still another alternative (not illustrated) is to use a spring loaded ball bearing instead of a roller. The ball bearing can be captured in a housing with a spring above in an arrangement similar to that of FIG. 10B.

Figure 11:
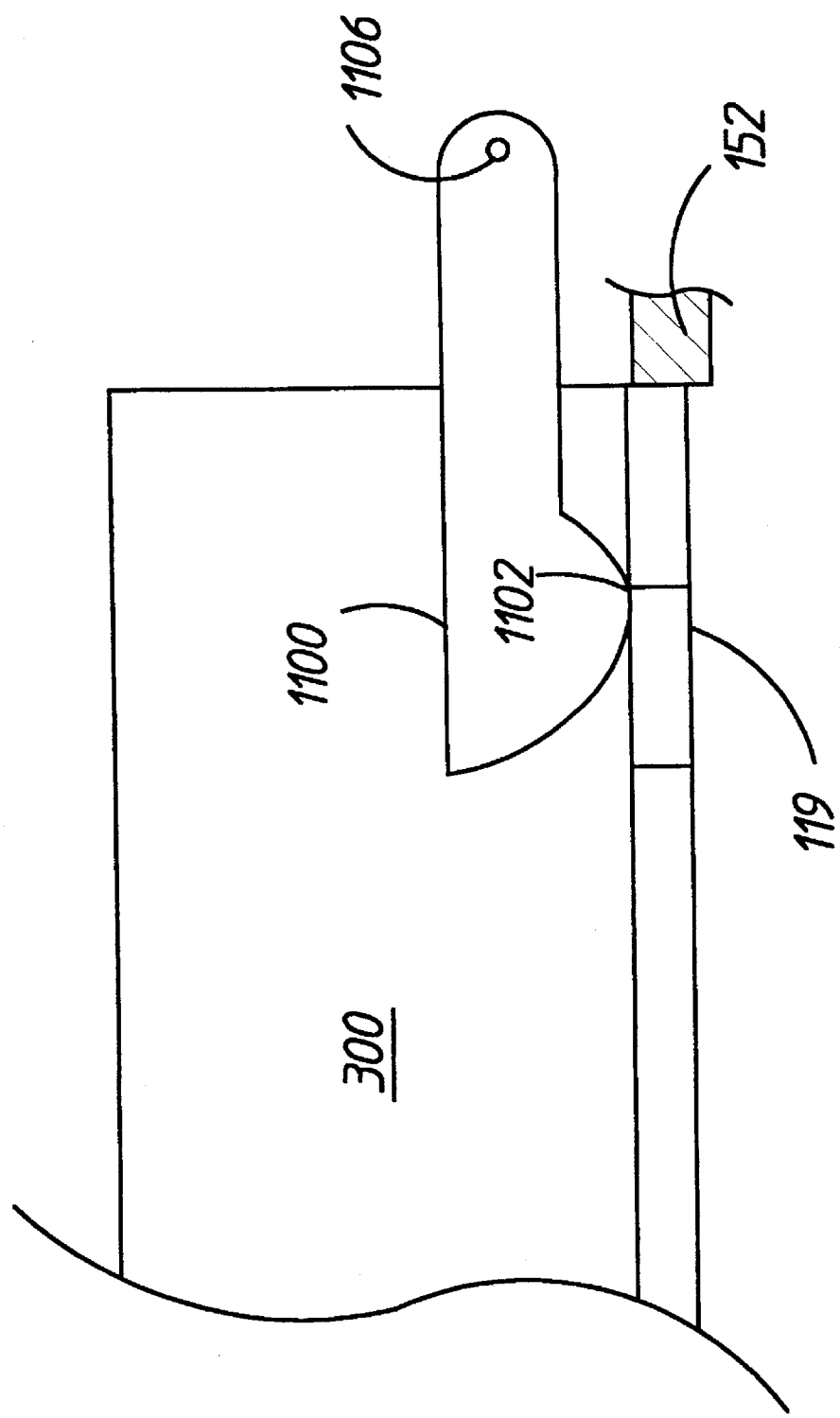
FIG. 11 is a side view of a mini-cartridge (either old or new) and a cut away side view of a portion of a chassis illustrating a cam surface as an alternative to the roller configurations of FIGS. 9A, 9B, 10A and 10B for alignment force as illustrated in FIG. 4.

FIG. 11 is a side view of a mini-cartridge 300 (either old or new) and part of a chassis illustrating an alternative to the embodiments of FIGS. 9A, 9B, 10A and 10B for providing front lower alignment force 404 as illustrated in FIG. 4. In the embodiment of FIG. 11, an arm 1100 has a lower cam surface 1102. The cam surface 1102 pushes the forward surface of notch 119 down (as viewed in FIG. 11) and forward to provide force 404 illustrated in FIG. 4. The arm 1100 may pivot around a pivot point 1106 as illustrated with a spring (not illustrated) forcing the arm counter clockwise or the arm 1100 may be made of flexible material and cantilevered from a rigid mounting. As still another alternative, the cam surface 1102 can be a curved flat spring cantilevered from a chassis mounting point. Of course, the arm 1100 can alternatively be mounted in the chassis so as to contact the lower surface of the baseplate of cartridge 300 to provide upward and forward force as illustrated by force 304 in FIG. 3.

Typically, when a mini-cartridge (either old or new) is inserted into a drive, the mini-cartridge will engage the upper latch system (FIGS. 5A–8B) before engaging the lower rollers or cams (FIGS. 1C, 9A, 9B, 10A, 10B or 11). The lower rollers/cams are designed to pivot or slide out of the way (downward for FIG. 1C, upward for FIGS. 9A, 9B, 10A, 10B and 11) until the rollers/cams are rolling/sliding on the mini-cartridge baseplate. Because both old and new mini-cartridges have a mini-cartridge top cover that overhangs the exposed top surface of the mini-cartridge baseplate, the rollers of FIGS. 9A, 9B, 10A, and 10B or the cam surface of FIG. 11 must be smaller than the opening between the top cover and the baseplate. As the mini-cartridge is inserted further into the drive, the rollers/cams encounter the forward edges of the notches in the sides of the baseplate. The vertical pressure against the forward edges of the notches causes the mini-cartridge to be pushed forward against chassis stops 156. This forward motion creates the feel of an over center spring mechanism. In the case of the roller of FIG. 1C, the roller forces the top surface of the front portion of the baseplate against chassis reference points. In the case of the rollers of FIGS. 9A, 9B, 10A, 10B or cam of FIG. 11, the rollers/cams force the bottom surface of the front portion of the baseplate against chassis reference points.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

We claim:

1. An apparatus in a drive chassis for aligning a magnetic data tape mini-cartridge with the drive chassis, the mini-cartridge having a top cover and a baseplate, the baseplate having a bottom surface, at least one mini-cartridge rear reference point defined on the bottom surface of the baseplate; the baseplate having a top surface, a front surface and a side surface; at least one mini-cartridge front reference point defined on the bottom surface of the baseplate, a notch in the side surface of the baseplate, the notch having a notch front surface, the apparatus comprising:

at least one drive front reference point defined in the drive chassis;

a bracket attached to the drive chassis;

at least one leaf spring, the leaf spring having a first end that is rigidly attached to the bracket and a second end that is flexible;

when the mini-cartridge is fully inserted into the drive chassis, the second end of the leaf spring presses against the top cover, forcing the mini-cartridge rear reference point against the drive front reference point;

at least one drive rear reference point defined in the drive chassis;

a roller, spring loaded to the drive chassis; and when the mini-cartridge is fully inserted into the drive chassis the roller is forced against the top surface of the baseplate and against the notch front surface, thereby providing force on the baseplate vertical to the baseplate forcing the mini-cartridge front reference point against the drive rear reference point and providing a force on the baseplate parallel to the baseplate in a direction toward the front surface of the baseplate.

2. An apparatus in a drive chassis for aligning a magnetic data tape mini-cartridge with the drive chassis, the mini-cartridge having a top cover and a baseplate, the baseplate having a bottom surface, at least one mini-cartridge rear reference point defined on the bottom surface of the baseplate; the baseplate having a top surface, a front surface and a side surface; at least one mini-cartridge front reference point defined on the top surface of the baseplate, a notch in the side surface of the baseplate, the notch having a notch front surface, the apparatus comprising:

at least one drive front reference point defined in the drive chassis;

a bracket attached to the drive chassis;

at least one leaf spring, the leaf spring having a first end that is rigidly attached to the bracket and a second end that is flexible;

when the mini-cartridge is fully inserted into the drive chassis the second end of the leaf spring presses against the top cover, forcing the mini-cartridge rear reference point against the drive front reference point;

at least one drive rear reference point defined in the drive chassis;

a roller, spring loaded to the drive chassis; and when the mini-cartridge is fully inserted into the drive chassis the roller is forced against the bottom surface of the baseplate and against the notch front surface, thereby providing force on the baseplate vertical to the baseplate forcing the mini-cartridge front reference point against the drive rear reference point and providing a force on the baseplate parallel to the baseplate in a direction toward the front surface of the baseplate.

3. An apparatus in a drive chassis for aligning a magnetic data tape mini-cartridge with the drive chassis, the mini-cartridge having a top cover and a baseplate, the top cover having a front area and a rear area, the baseplate having a bottom surface, at least one mini-cartridge rear reference point defined on the bottom surface of the baseplate, the apparatus comprising:

at least one drive front reference point defined in the drive chassis;

a flat spring pivotally attached to the drive chassis, the flat spring having a front edge and a rear edge; and when the mini-cartridge is being inserted into the drive chassis, the front area of the top cover contacts the rear edge of the flat spring, forcing the rear edge of the flat spring upward and above the top cover, thereby pivoting the front edge of the flat spring against the rear area of the top cover forcing the mini-cartridge rear reference point against the drive front reference point.

4. The apparatus of claim 3; the baseplate having a top surface, a front surface and a side surface; at least one mini-cartridge front reference point defined on the bottom surface of the baseplate, a notch in the side surface of the baseplate, the notch having a notch front surface, the apparatus comprising:

at least one drive rear reference point defined in the drive chassis;

a roller, spring loaded to the drive chassis; and when the mini-cartridge is fully inserted into the drive chassis the roller is forced against the top surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

5. The apparatus of claim 3; the baseplate having a top surface, a front surface and a side surface; at least one mini-cartridge front reference point defined on the top surface of the baseplate, a notch in the side surface of the baseplate, the notch having a notch front surface, the apparatus comprising:

at least one drive rear reference point defined in the drive chassis;

a roller, spring loaded to the drive chassis; and when the mini-cartridge is fully inserted into the drive chassis the roller is forced against the bottom surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

6. An apparatus in a drive chassis for aligning a magnetic data tape mini-cartridge with the drive chassis, the mini-cartridge having a top cover and a baseplate, the baseplate having a bottom surface, at least one mini-cartridge rear reference point defined on the bottom surface of the baseplate; the baseplate having a top surface, a front surface and a side surface; at least one mini-cartridge front reference point defined on the bottom surface of the baseplate, a notch in the side surface of the baseplate, the notch having a notch front surface, the apparatus comprising:

at least one drive front reference point defined in the drive chassis;

a bracket attached to the drive chassis;

at least one spring, the spring having a first end that is attached to the bracket and a second end that is moveable;

a first roller attached to the second end of the spring;

when the mini-cartridge is fully inserted into the drive chassis, the first roller presses against the top cover forcing the mini-cartridge the drive front reference point;

at least one drive rear reference point defined in the drive chassis;

a second roller, spring loaded to the drive chassis; and when the mini-cartridge is fully inserted into the drive chassis the second roller is forced against the top surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

7. An apparatus in a drive chassis for aligning a magnetic data tape mini-cartridge with the drive chassis, the mini-cartridge having a top cover and a baseplate, the baseplate having a bottom surface, at least one mini-cartridge rear reference point defined on the bottom surface of the baseplate; the baseplate having a top surface, a front surface and a side surface; at least one mini-cartridge front reference point defined on the top surface of the baseplate, a notch in the side surface of the baseplate, the notch having a notch front surface, the apparatus comprising:

at least one drive front reference point defined in the drive chassis;

a bracket attached to the drive chassis;

at least one spring, the spring having a first end that is attached to the bracket and a second end that is moveable;

a first roller attached to the second end of the spring;

when the mini-cartridge is fully inserted into the drive chassis, the first roller presses against the top cover, forcing the mini-cartridge rear reference point against the drive front reference point;

at least one drive rear reference point defined in the drive chassis;

a second roller, spring loaded to the drive chassis; and when the mini-cartridge is fully inserted into the drive chassis the second roller is forced against the bottom surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

8. The apparatus of claim 7, the first roller being substantially spherical.

9. An apparatus in a drive chassis for aligning a magnetic data tape mini-cartridge with the drive chassis, the mini-cartridge having a top cover and a baseplate, the baseplate having a bottom surface, at least one mini-cartridge rear reference point defined on the bottom surface of the baseplate; the baseplate having a top surface, a front surface and a side surface; at least one mini-cartridge front reference point defined on the bottom surface of the baseplate, a notch in the side surface of the baseplate, the notch having a notch front surface, the apparatus comprising:

at least one drive front reference point defined in the drive chassis;

a bracket attached to the drive chassis;

at least one opening in the bracket, the opening having first and second sides;

at least one axle;

a first roller on the axle;

the bracket having first and second notches going into the first and second sides respectively, the axle located in the notches with the first roller protruding partially through the opening;

a flat spring coupled to the bracket; the flat spring having first and second fingers holding the axle into the first and second notches respectively;

when the mini-cartridge is fully inserted into the drive chassis, the first roller presses against the top cover, deflecting the first and second fingers of the spring, forcing the mini-cartridge rear reference point against the drive front reference point;

at least one drive rear reference point defined in the drive chassis;

a second roller, spring loaded to the drive chassis; and when the mini-cartridge is fully inserted into the drive chassis the second roller is forced against the top surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

10. An apparatus in a drive chassis for aligning a magnetic data tape mini-cartridge with the drive chassis, the mini-cartridge having a top cover and a baseplate; the baseplate having a bottom surface, at least one mini-cartridge rear reference point defined on the bottom surface of the baseplate; the baseplate having a top surface, a front surface and a side surface; at least one mini-cartridge front reference point defined on the top surface of the baseplate, a notch in the side surface of the baseplate, the notch having a notch front surface, the apparatus comprising:

at least one drive front reference point defined in the drive chassis;

a bracket attached to the drive chassis;

at least one opening in the bracket; the opening having first and second sides;

at least one axle;

a first roller on the axle;

the bracket having first and second notches going into the first and second sides respectively; the axle located in the notches with the first roller protruding partially through the opening;

a flat spring coupled to the bracket; the flat spring having first and second fingers holding the axle into the first and second notches respectively;

when the mini-cartridge is fully inserted into the drive chassis; the first roller presses against the top cover, deflecting the first and second fingers of the spring, forcing the mini-cartridge rear reference point against the drive front reference point:

at least one drive rear reference point defined in the drive chassis;

a second roller, spring loaded to the drive chassis; and when the mini-cartridge is fully inserted into the drive chassis the second roller is forced against the bottom surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

11. An apparatus in a drive chassis for aligning a magnetic data tape mini-cartridge with the drive chassis, the mini-cartridge having a top cover and a baseplate, the top cover having at least one top cover step, the baseplate having a bottom surface, at least one mini-cartridge rear reference point defined on the bottom surface of the baseplate, the apparatus comprising:

at least one drive front reference point defined in the drive chassis;

a bracket attached to the drive chassis;

at least one first roller, spring loaded to the bracket;

the first roller having a first cylindrical section and a second cylindrical section, the first cylindrical section having a first diameter and the second cylindrical section having a second diameter, the first and second diameters unequal and forming a roller step between the first and second cylindrical sections;

when the mini-cartridge is partially inserted into the drive chassis, the roller step guides the top cover step of the mini-cartridge; and when the mini-cartridge is fully inserted into the drive chassis, one of the cylindrical sections of the first roller presses against the top cover, forcing the mini-cartridge rear reference point against the drive front reference point.

12. The apparatus of claim 11; the baseplate having a top surface, a front surface and a side surface; at least one mini-cartridge front reference point defined on the bottom surface of the baseplate, a notch in the side surface of the baseplate, the notch having a notch front surface, the apparatus comprising:

at least one drive rear reference point defined in the drive chassis;

a second roller, spring loaded to the drive chassis; and when the mini-cartridge is fully inserted into the drive chassis the second roller is forced against the top surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

13. The apparatus of claim 11; the baseplate having a top surface, a front surface and a side surface; at least one mini-cartridge front reference point defined on the top surface of the baseplate, a notch in the side surface of the baseplate, the notch having a notch front surface, the apparatus comprising:

at least one drive rear reference point defined in the drive chassis;

a second roller, spring loaded to the drive chassis; and when the mini-cartridge is fully inserted into the drive chassis, the second roller is forced against the bottom surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

14. An apparatus in a drive chassis for aligning a magnetic data tape mini-cartridge with the drive chassis, the mini-cartridge having a baseplate; the baseplate having a top surface, a bottom surface, a front surface and a side surface; at least one mini-cartridge front reference point defined on the bottom surface of the baseplate, a notch in the side surface of the baseplate, the notch having a notch front surface, the apparatus comprising:

at least one drive rear reference point defined in the drive chassis;

a plane defined by the bottom surface of the baseplate;

a roller, constrained to move along a particular direction that is substantially perpendicular to the plane defined by the bottom surface of the baseplate, the roller spring loaded to the drive chassis along the particular direction; and when the mini-cartridge is fully inserted into the drive chassis the roller is forced against the top surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

15. An apparatus in a drive chassis for aligning a magnetic data tape mini-cartridge with the drive chassis, the mini-cartridge having a baseplate; the baseplate having a top surface, a bottom surface, a front surface and a side surface; at least one mini-cartridge front reference point defined on the bottom surface of the baseplate, a notch in the side surface of the baseplate, the notch having a notch front surface, the apparatus comprising:

at least one drive rear reference point defined in the drive chassis;

a lever arm having a cam end and an attachment end, the attachment end attached to the drive chassis;

a cam surface formed at the cam end of the lever arm; and when the mini-cartridge is fully inserted into the drive chassis the cam surface is forced against the top surface of the baseplate and against the notch front surface, thereby providing force on the baseplate vertical to the baseplate forcing the mini-cartridge front reference point against the drive rear reference point and providing force on the baseplate parallel to the baseplate in a direction toward the front surface of the baseplate.

* * * * *

UNITED STATES PATENT AND TRADEMARK OFFICE
CERTIFICATE OF CORRECTION

PATENT NO. : 5,557,485
DATED : 09/17/96
INVENTOR(S) : Fred O. Stephens, et al.

It is certified that error appears in the above-identified patent and that said Letters Patent is hereby corrected as shown below:

Column 12, line 43, "forcing the mini-cartridge the drive front reference" should read -- forcing the mini-cartridge rear reference point against the drive front reference--.

Signed and Sealed this

Nineteenth Day of May, 1998

*Attest:*

*Attesting Officer*

BRUCE LEHMAN

*Commissioner of Patents and Trademarks*